Oct. 14, 1941.    W. R. TUCKER ET AL    2,259,401
FLUID HEAT TRANSFER UNIT
Filed Aug. 31, 1939    3 Sheets-Sheet 2

*Inventors*
WARREN R. TUCKER,
VICTOR. S. SHAW,
BY
Toulmin & Toulmin
*Attorneys*

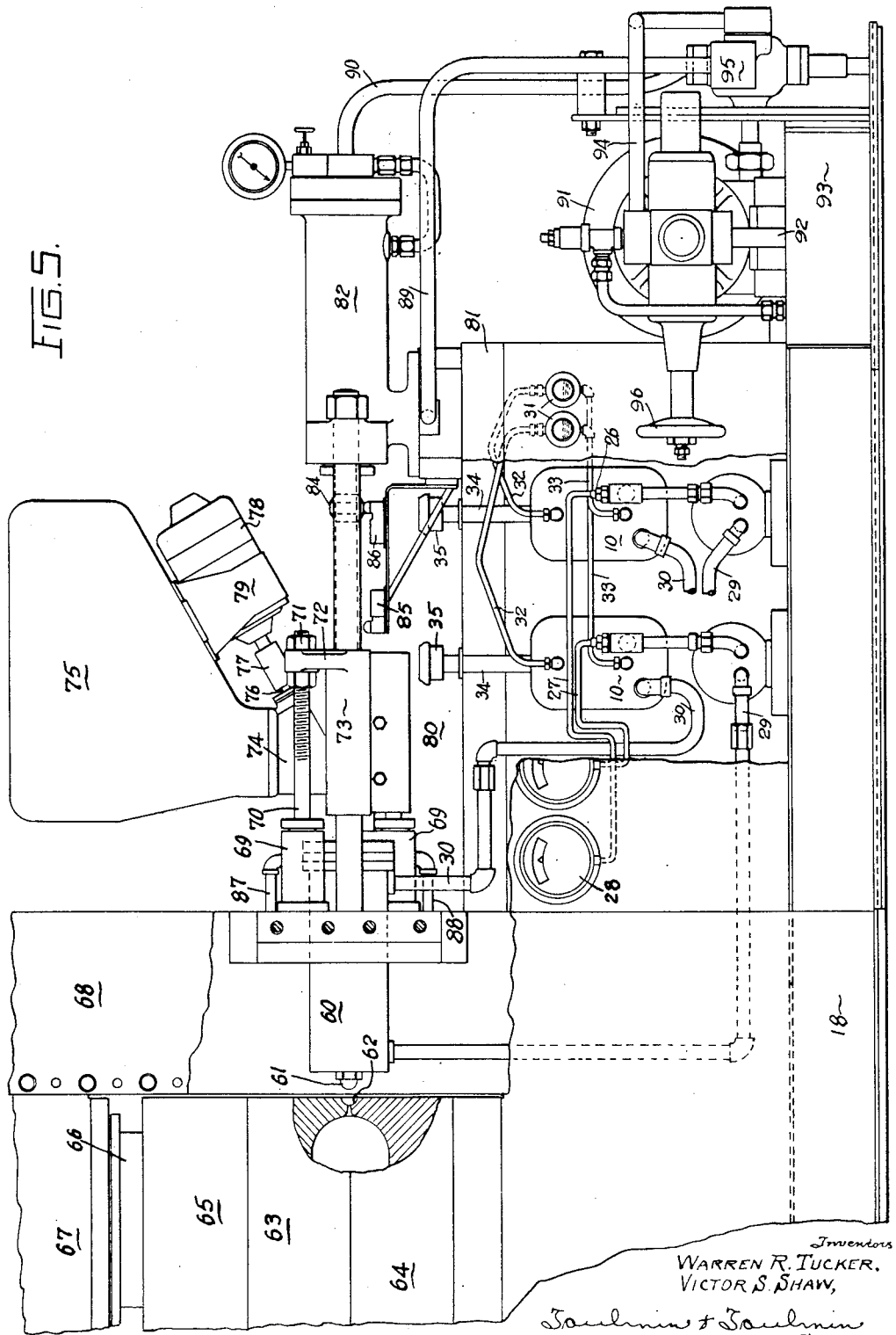

Patented Oct. 14, 1941

2,259,401

UNITED STATES PATENT OFFICE 2,259,401

FLUID HEAT TRANSFER UNIT

Warren R. Tucker and Victor S. Shaw, Mount Gilead, Ohio, assignors to The Hydraulic Development Corp. Inc., Wilmington, Del., a corporation of Delaware Application August 31, 1939, Serial No. 292,940

10 Claims. (Cl. 219—39)

This invention relates to heating apparatus, and in particular, to apparatus for transferring heat from the heating source to a point of utilization by means of a heat-transfer medium.

One object of this invention is to provide a heating apparatus having an electrical heat source located remote from the heat utilization point, and having a liquid heat-transfer medium.

Another object is to provide a heating apparatus employing an electrical heating unit located remote from the point of utilization, and having a high temperature liquid as a heat-transfer medium, such as an oil with a high flash point, the transfer medium being circulated by a forced feed device, such as a pump.

Another object is to provide a heating apparatus for heating an object located remote from the source of heat, the heat being conducted from the heat source to the point of utilization by a high temperature liquid medium through the use of a forced feed circulator, such as a motor-driven pump.

In the drawings:

Figure 5 is a side elevation, partly in section, of a plastic injection molding press employing the heating apparatus of this invention for heating the injection cylinders to render the molding material plastic.

In general, the heating apparatus of this invention consists of a chamber containing a high temperature liquid as a heat-transfer medium, such as an oil with a very high flash point. The chamber contains an electrical heating device which heats the oil, or other liquid, to the desired temperature. A motor-driven pump forces the oil from the chamber to the point of utilization, such as the injection cylinder of a plastic injection molding press, and thence back to the chamber for reheating.

Hitherto in the use of machinery requiring heat for carrying out the operations, it has been found difficult to obtain a reliable source of heat which will maintain the temperature within close limits. Where steam has been employed it has been found necessary, under the laws of many of the states, to employ a licensed engineer and to install steam boilers and expensive piping systems. This steam heating equipment was found to be inflexible, and a boiler of adequate size to meet the largest possible requirements had to be installed even though the immediate heat requirements were relatively small, due to the difficulty and expense of later increasing the size of the installation.

The present invention enables heat to be produced in individual units so that one unit can be used for each machine. As the source of heat is electricity it is unnecessary to install any steam heating system, and it is likewise unnecessary to employ a licensed engineer. The arrangement is very flexible because additional heating units can easily be installed for additional machines without a great increase in expense. Furthermore, only the heating units which are in immediate demand are kept in operation at a given time, whereas in the case of a steam heating system it was necessary to keep the main boiler operating regardless of the amount of steam being used.

In the present invention, moreover, the heat unit may be employed with any type of machine, and does not need to be built into the machine. The apparatus of this invention is complete in itself, and includes the heating chamber with its heat-transferring liquid, the electrical heating units immersed in the liquid and the pump and motor for circulating the heat-transferring liquid to and from the point of utilization.

Figure 1:
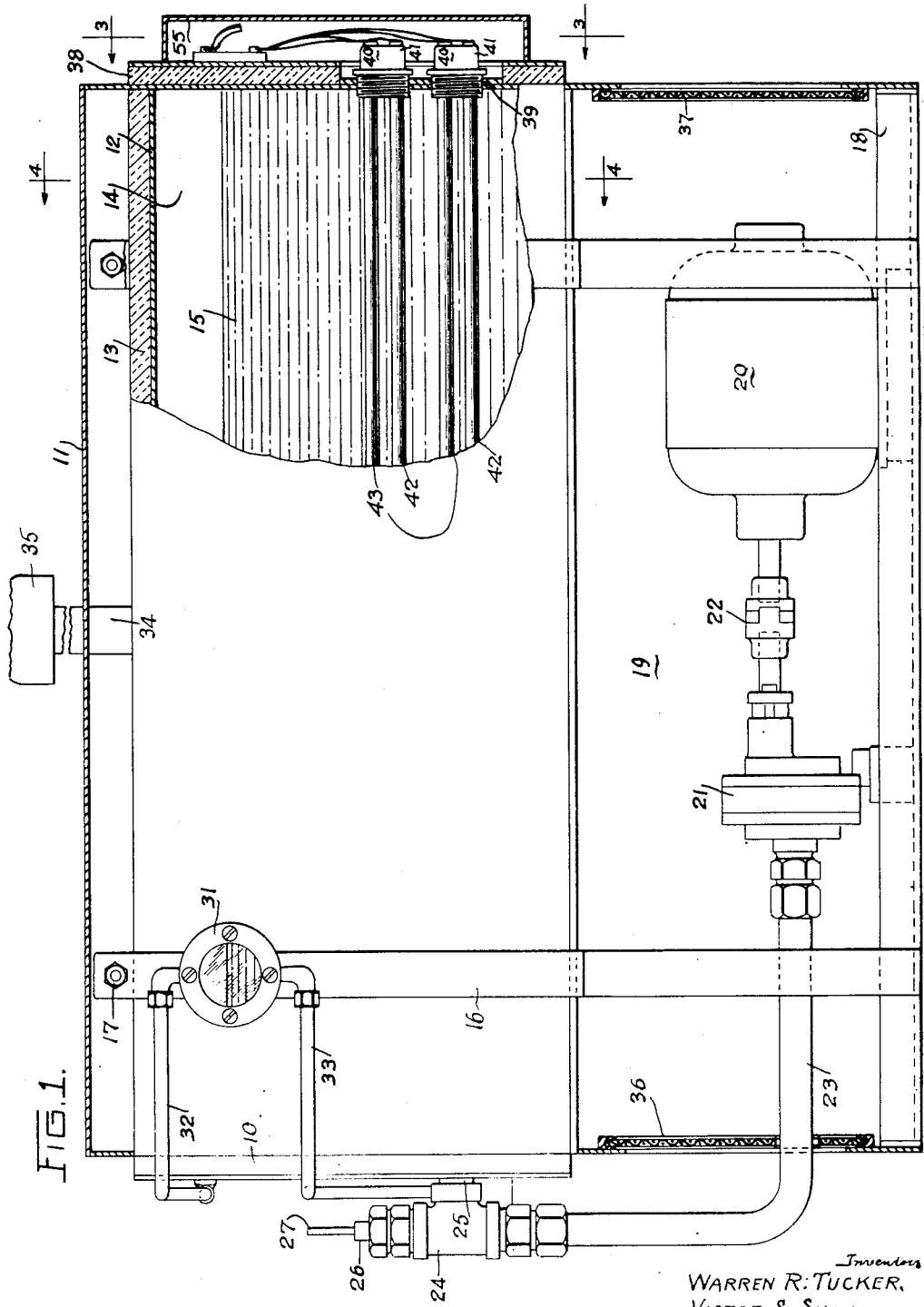
Figure 1 is a side elevation, partly in section, of a heating apparatus according to one embodiment of the invention.
Figure 2:
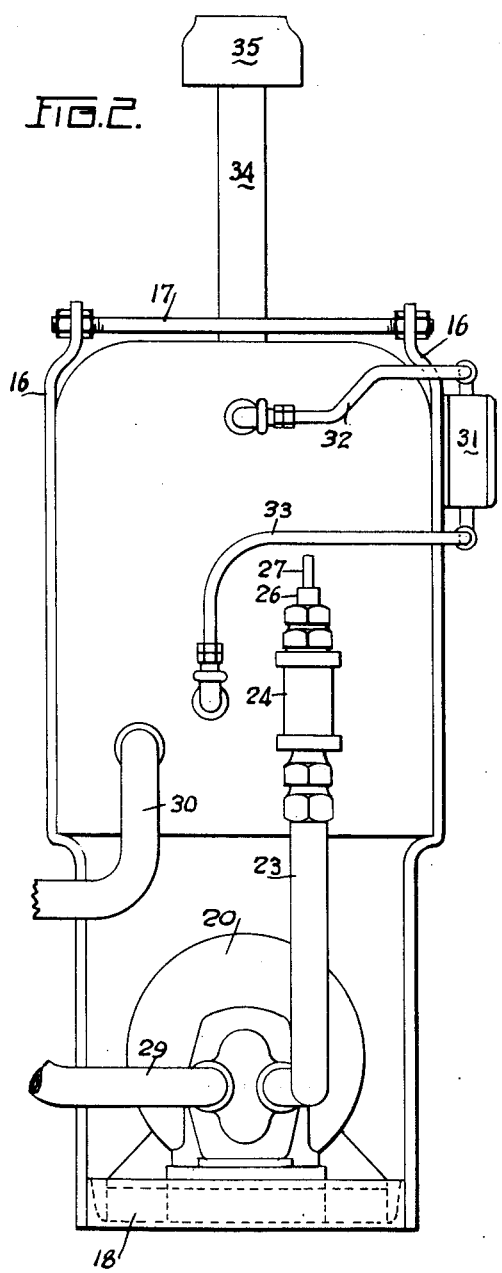
Figure 2 is a left-hand end elevation of the heating apparatus shown in Figure 1, with the end grating of the motor and pump compartment removed.

Referring to the drawings in detail, Figure 1 shows a heating apparatus according to the invention, and generally designated 10. The heating apparatus 10 consists of a housing 11, such as of sheet metal, having a liquid container 12 mounted therein and surrounded by an insulation layer 13. The chamber 14 within the container 12 serves to hold a high-temperature heat-transferring liquid 15, such as certain grades of oil with a high flash point. The container 12 and housing 11 are held together and supported by frame members 16 and tie bolts 17, and at their lower ends are secured to a base 18, as by welding. The portion of the housing 11 beneath the container 12 forms a motor and pump chamber 19 containing a motor 20, operatively connected to the pump 21 as by the coupling 22.

The pump 21 is provided with an intake conduit 23 running to the T-coupling 24, which is connected, as at 25, to the interior of the container 12. The T-coupling 24 likewise contains the bulb (not shown) of a remote reading thermometer 26 having a tube 27 extending from the thermometer bulb to the indicating instrument 28 (Figure 5). The pump 21 is also provided with an outlet or discharge conduit 29, by which the heated oil is conveyed to the point of utilization, such as the cylinder of a plastic injection molding machine. From the point of utilization the conduit 30 runs back to the container 12 for returning the cooled oil to the container for reheating. A liquid level gauge 31 is also provided for indicating the level of the heat-transfer liquid within the container 12, and is connected thereto by means of the conduits 32 and 33. Extending from the top of the container 12, through the housing 11, is a breather pipe 34, terminating in a breather cap 35. The opposite ends of the chamber 19 in the lower part of the housing 11 are provided with gratings 36 and 37 for permitting the circulation of air to prevent an undue rise of temperature in the chamber 19.

Figure 3:
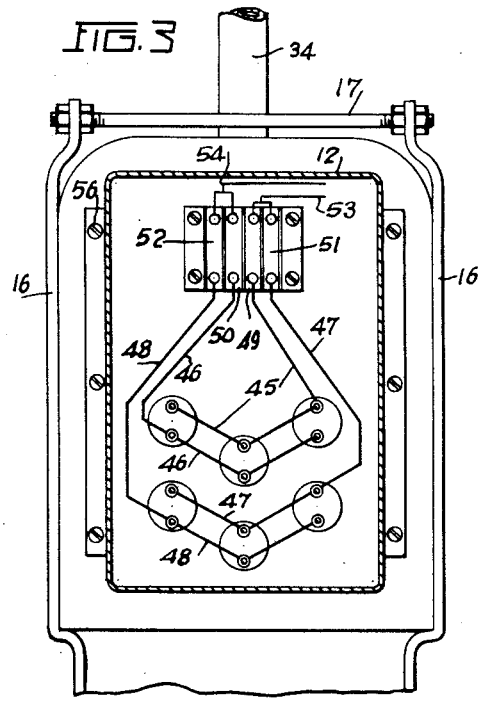
Figure 3 is a cross section along the line 3—3 in Figure 1, showing the electrical connections to the ends of the electrical heating units.
Figure 4:
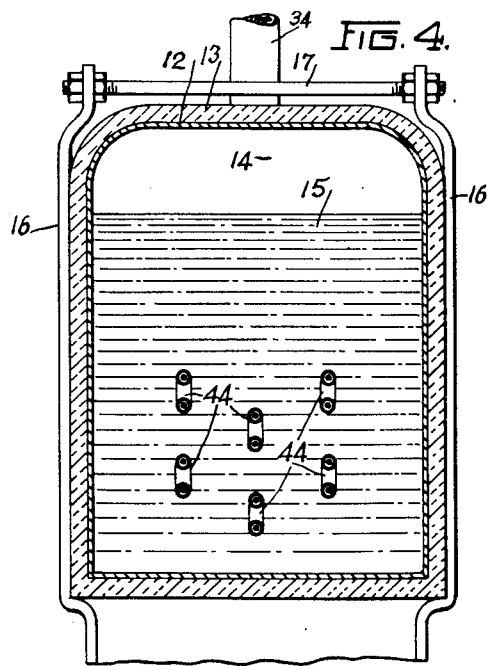
Figure 4 is a cross section along the line 4—4 in Figure 1.

One end of the container 12 and its insulating end plate 38 project from the housing 11 and container apertures 39 for the mounting of electrical heating units 40. These consist of end junctions 41 for heating tubes 42 and 43 (Figure 1), interconnected at their opposite ends by the members 44 (Figure 4). The heating tubes 42 and 43 contain electrical heating elements which are arranged in two groups. The ends of the heating elements are respectively connected to the lines 45, 46, 47 and 48. These are connected respectively to the terminal plates 49, 50, 51 and 52. The terminal plates 49 to 52 may be connected in any suitable manner, according to the voltage supplied thereto. In the arrangement shown the terminal plates 49 and 51 are jointly connected to the line 53, whereas the terminal plates 50 and 52 are jointly connected to the line 54. The lines 53 and 54 are connected to the current mains through appropriate switches. The terminal plates and ends of the heating units 40 are covered by an end closure 55 (Figure 1), secured to the insulating end plate 38 by the screws 56 (Figure 3).

The heating apparatus of this invention may be employed in connection with various machines, Figure 5 showing an installation of two such units for heating a pair of injection cylinders 60 arranged side-by-side, one only being shown. The left-hand heating apparatus 10 is connected to the visible injection cylinder 60, whereas the right-hand one is connected to the second injection cylinder lying behind the visible injection cylinder 60. Each injection cylinder 60 is provided with a nozzle 61, arranged to engage a socket 62 in a pair of cooperating dies 63 and 64. The die 63 is connected to the ram 65 mounted upon the die-clamping plunger 66 reciprocable in the main cylinder 67. The ram 65 is guided in its reciprocation by the press side members 68.

Each injection cylinder 60 is moved into and out of engagement with the dies 63 and 64 by means of hydraulic cylinders 69 having plungers 70, anchored as at 71 to the arms 72 forming a part of the members 73 which support the base 74 for the feeding hopper 75. The base 74 contains a feeding element 76, such as a feeding screw, connected by the coupling 77 to the feeding motor 78. The latter is supported by the bracket 79 mounted upon the feeding hopper 75. The member 73 is, in turn, mounted upon the base 80 which rests upon the bed 81 of the molding machine. The latter supports the injector operating cylinder 82, having a plunger reciprocable therein and carrying a cam 84 for actuating limit switches 85 and 86.

Pressure fluid is supplied to the cylinders 69 and 82 through the conduits 87, 88, 89 and 90 from the variable delivery pump 91. The latter has a suction conduit 92 leading to a tank 93 in the base of the machine, and a discharge conduit 94 leading to a four-way valve 95. The variable delivery pump 91 is of the centering type which automatically is shifted to zero delivery or neutral when the pressure in the discharge line 94 reaches a predetermined amount, as is well known to those skilled in the art. This limiting pressure is adjusted by rotating the hand wheel 96. The details of the plastic injection molding machine shown in Figure 5 form no part of the invention and are merely illustrative of one type of machine with which the heating apparatus of this invention may be advantageously employed.

In the operation of the heating apparatus of this invention the motor 20 is started in operation, and electricity of proper voltage is supplied to the lines 53 and 54. The heating units 40 are then heated by the resistance of the electrical elements within the tubes 42 and 43 and transfer this heat to the oil 15, or other liquid heat-transfer medium within the chamber 14. The rotation of the motor 20 rotates the pump 21 so that the heated liquid is withdrawn from the chamber 14 through the conduit 23, and is pumped through the conduit 29 to the point of utilization, such as the injection cylinder 60. After the liquid has given up a sufficient amount of its heat, it is conveyed back to the chamber 14 within the container 12 by the conduit 30. The liquid returned to the chamber 14 is again reheated by the electrical heating units 40, and then is recirculated by means of the pump 21. The temperature of the heating liquid is indicated by the indicating instrument 28, to which the heat has been conveyed from the thermometer bulb 26 by the tubes 27. By varying the amount of electricity the temperature of the liquid can be maintained at any desired point.

The electrical heating apparatus of this invention may be employed in any type of machine, such as for heating dies or processing chambers, the application to a plastic injection molding machine being merely given for purposes of illustration.

It will be understood that we desire to comprehend within our invention such modifications as come within the scope of the claims and the invention.

Having thus fully described our invention, what we claim as new and desire to secure by Letters Patent, is:

1. In a self-contained fluid circulating heating apparatus, a container having a heat-transferring liquid therein, an electrical heating device in said container, and power-driven means for circulating the liquid, said electrical heating device comprising a plurality of electrical immersion heater tubes extending horizontally through said container and emerging through one end wall thereof, and a terminal board mounted on said wall for interconnecting said heater tubes to a source of electrical energy.

2. In a self-contained fluid circulating heating apparatus, a container having a heat-transferring liquid therein and an outlet and inlet, a plurality of electrical immersion heating units extending into said container from one wall thereof, and means for selectively interconnecting said units in different electrical arrangements.

3. In a self-contained fluid circulating heating apparatus, a container having a heat-transferring liquid therein and an outlet and inlet, a plurality of electrical immersion heating units extending into said container from one wall thereof, a terminal plate connected to one end of each unit, and means positioned upon said wall for selectively interconnecting said terminal plates in different electrical arrangements.

4. In a self-contained fluid circulating and heating apparatus, an insulated container adapted to contain a heat transfer medium, an electrical heating device positioned within said container, a base, means for supporting said container a substantial distance above said base, a power driven fluid circulating pump mounted upon said base and below said container and in fluid circulating communication with said container, and a removable housing inclosing said apparatus.

5. In a self-contained fluid circulating and heating apparatus, an insulated container adapted to contain a heat transfer medium, an electrical heating device positioned within said container, a base, supporting brackets extending upwardly from said base adjacent the side walls of said container, means for retaining said container between said brackets in spaced relation to said base to form a machinery compartment, and a power driven fluid circulating pump mounted upon said base within said compartment and in fluid circulating communication with said container.

6. In a self-contained fluid circulating and heating apparatus, an insulated container of substantial volume adapted to contain a heat transfer medium, an electrical heating device positioned within said container, a base, means for supporting said container a substantial distance above said base to provide a machinery compartment therebetween, and a power driven fluid circulating pump mounted in said machinery compartment upon said base and in fluid circulating communication with said container.

7. In a self-contained fluid circulating and heating apparatus, an insulated container adapted to contain a heat transfer medium, a plurality of electrical heating devices extending into said container through an end wall thereof, means positioned upon said wall for selectively interconnecting said heating devices in different electrical arrangements, a base, means for supporting said container upon a base, and a power driven fluid circulating pump mounted upon said base and in fluid circulating communication with said container.

8. In a self-contained fluid circulating and heating unit, an insulated container adapted to contain a heat transfer medium, an electrical heating device positioned within said container, a base, means for supporting said container in spaced relation to said base to provide a machinery compartment between said container and said base, a power driven fluid circulating pump mounted below said container within said compartment and upon said base and in fluid circulating communication with said container, and a separable housing enclosing said unit.

9. In a self-contained fluid circulating and heating unit, an insulated container adapted to contain a heat transfer medium, an electrical heating device positioned within said container, a base, means for supporting said container in spaced relation to said base, a power driven fluid circulating pump mounted below said container upon said base and in fluid circulating communication with said container, and a separable housing enclosing said unit, said housing having openings in opposite walls for cross-ventilation thereof.

10. In a self-contained fluid circulating and heating apparatus, an insulated container adapted to contain a heat transfer medium, an electrical heating device positioned within said container, a base, supporting brackets extending upwardly from said base and having ledges to support said container, means for clamping said brackets upon said container to retain same in position upon said ledges and to support same in spaced relation to said base, and a power driven fluid circulating pump mounted below said container upon said base and in fluid circulating communication with said container.

WARREN R. TUCKER.
VICTOR S. SHAW.